(12) United States Patent
Hibino et al.

(10) Patent No.: US 10,240,054 B2
(45) Date of Patent: Mar. 26, 2019

(54) METHOD FOR MANUFACTURING AQUEOUS PIGMENT DISPERSION AND AQUEOUS INK FOR INKJET RECORDING

(71) Applicant: DIC Corporation, Tokyo (JP)

(72) Inventors: Ryota Hibino, Kita-adachi-gun (JP); Kumiko Iizasa, Kita-adachi-gun (JP); Hideki Gambayashi, Kita-adachi-gun (JP); Shinichi Okada, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/548,637

(22) PCT Filed: Feb. 9, 2016

(86) PCT No.: PCT/JP2016/053769
§ 371 (c)(1),
(2) Date: Aug. 3, 2017

(87) PCT Pub. No.: WO2016/129585
PCT Pub. Date: Aug. 18, 2016

(65) Prior Publication Data
US 2018/0010005 A1  Jan. 11, 2018

(30) Foreign Application Priority Data

Feb. 13, 2015  (JP) .................. 2015-026380

(51) Int. Cl.
| C09D 11/38 | (2014.01) |
| B41J 2/01 | (2006.01) |
| C09D 11/322 | (2014.01) |
| C09D 17/00 | (2006.01) |
| C09D 11/10 | (2014.01) |
| C09D 7/63 | (2018.01) |

(52) U.S. Cl.
CPC .............. C09D 11/38 (2013.01); B41J 2/01 (2013.01); C09D 7/63 (2018.01); C09D 11/10 (2013.01); C09D 11/322 (2013.01); C09D 17/00 (2013.01); C09D 17/001 (2013.01)

(58) Field of Classification Search
None
See application file for complete search history.

(56) References Cited

U.S. PATENT DOCUMENTS

| 5,082,498 A | 1/1992 | Kurtz et al. |
| 2005/0229811 A1 | 10/2005 | Kato et al. |
| 2006/0000392 A1 | 1/2006 | Reisacher et al. |
| 2013/0338310 A1 | 12/2013 | Shimamura et al. |

FOREIGN PATENT DOCUMENTS

| JP | 57-90066 A | 6/1982 |
| JP | 3-103480 A | 4/1991 |
| JP | 2005-298643 A | 10/2005 |
| JP | 2006-506489 A | 2/2006 |
| JP | 2014-105224 A | 6/2014 |
| WO | 2012/086789 A1 | 6/2012 |

OTHER PUBLICATIONS

International Search Report dated May 10, 2016, issued in counterpart International Application No. PCT/JP2016/053769 (2 pages).
Notification of Reasons for Refusal dated Sep. 13, 2016, issued in counterpart Japanese Patent Application No. 2016-543207, w/English translation (9 pages).

*Primary Examiner* — Robert T Butcher
(74) *Attorney, Agent, or Firm* — Westerman, Hattori, Daniels & Adrian, LLP

(57) ABSTRACT

Provided is a method for producing an aqueous pigment dispersion including a step of dispersing a mixture containing a pigment, an anionic group-containing organic polymer compound, a basic compound, and from 1% to 500% by mass of alkylene oxide adduct having a polyamine structure with respect to the pigment into water. The step of dispersing includes Step 1 of kneading a mixture which contains a pigment, an anionic group-containing organic polymer compound, a basic compound, and from 1% to 500% by mass of alkylene oxide adduct having a polyamine structure with respect to the pigment, and which contains no water or water equal to or less than 30% by mass with respect to a solid content thereof, and Step 2 of dispersing a kneaded material obtained in Step 1 into water.

5 Claims, No Drawings

METHOD FOR MANUFACTURING AQUEOUS PIGMENT DISPERSION AND AQUEOUS INK FOR INKJET RECORDING

TECHNICAL FIELD

The present invention particularly relates to a method for producing an aqueous pigment dispersion useful as a pigment dispersion for ink for ink jet recording, and an aqueous ink for inkjet recording using the aqueous pigment dispersion obtained according to the producing method.

BACKGROUND ART

Conventionally, an aqueous ink as ink for ink jet-recording which is excellent in water resistance and light resistance of a recorded image on a recording material has been proposed. In the inkjet printing, ink droplets are ejected from a printer head for printing. A piezo method and a thermal method are mainly used as an ink ejection method for image recording applications. Particularly, in the thermal method, it is known that ink in a nozzle is boiled by a heater of a heating resistor element disposed in the printer head so as to eject the ink droplets, and thus due to a sudden change in the temperature inside the nozzle, phenomenon called kogation in which aggregates such as decompositions of a coloring material and multivalent metal salt are deposited on a surface of the heating resistor element occurs. In addition, it is also known that ink aggregates cause clogging of the head even in the piezo type inkjet method in which kogation does not occur.

One of causes of the aggregates generated in the ink is multivalent metal ions as impurities derived from pigments and water. For example, a large amount of calcium ions which easily react with anions and easily form a product which is sparingly soluble in water are contained in a pigment in some cases, which causes the deposits or the aggregates at the time of producing ink or using the ink, thereby adversely affecting ejectability and storage stability. Generally, the aqueous ink contains a surfactant and other additives in addition to the pigment and water. Examples of the frequently used surfactants include an anionic surfactant such as sulfate and phosphate of polyoxyethylene alkyl ether, and these anions are known to easily react with metal ions. Particularly, in the case where the anions react with the calcium ions, it is likely that a water-insoluble crystal such as calcium carbonate or calcium sulfate is generated. In addition, similarly, carbonate, sulfate, or phosphate which is generally used as a pH buffer or a pH regulator is also likely to generate the water-insoluble crystal. Even though the amount of these aggregates is extremely small, a droplet speed of the ink is decreased in long-time printing, which eventually causes the ink not to be ejected, and thus in the inkjet field where ejection reliability is regarded as important, it is strongly desired to reduce multivalent metal ions in ink.

Examples of a method for reducing the multivalent metal ions in the ink include a method for directly reducing the multivalent metal ions from the ink after preparation, and a method for reducing the multivalent metal ions contained in a pigment or an aqueous pigment dispersion which is a raw material of ink.

The aqueous pigment dispersion (referred to as a pigment paste in some cases) is obtained by dispersing a pigment into water with a surfactant or a resin having an ionic group at a high concentration, and is used as a typical raw material of ink by being mixed with water for dilution, a surfactant or other additives necessary for the ink properties. Accordingly, it can be expected to reduce aggregates generated in the obtained ink by reducing the multivalent metal ions in the aqueous pigment dispersion.

In addition, it is known that the multivalent metal ion may crosslink a resin adsorbed to a pigment surface, which contributes to the dispersion stability to thereby cause secondary aggregates of the pigment particles, and accordingly, the aqueous pigment dispersion in which the multivalent metal ions are reduced is desired from the viewpoint of the dispersion stability of the aqueous pigment dispersion.

As a method for preventing the generation of aggregates by reducing the multivalent metal or the multivalent metal ions in the aqueous ink or the aqueous pigment dispersion, for example, PTL 1 discloses that a particle having a chelate forming group or a fibrous resin is caused to be in contact with the aqueous ink or the aqueous pigment dispersion so as to remove the multivalent metal, and thereby it is possible to prevent the kogation or aggregates from being generated. The method of PTL 1 is an effective method for reducing the multivalent metal ions; however, a step of contacting or removing the particles having a chelate forming group or a fibrous resin was essential in the process of producing the aqueous ink.

CITATION LIST

Patent Literature

[PTL 1] WO 2012/086789 A
[PTL 2] JP-A-57-90066
[PTL 3] JP-A-2005-298643

SUMMARY OF INVENTION

Technical Problem

According to the present invention, there is provided a method for producing an aqueous pigment dispersion, which enables an aqueous ink to have a reduced amount of multivalent metal ions present therein at the time of preparing the aqueous ink, without using a particle having a chelate forming group or a fibrous resin which is required to be removed, and an aqueous ink for inkjet recording in which an aqueous pigment dispersion obtained by the producing method is used.

Solution to Problem

The present inventors of the present invention have solved the problem by producing a mixture containing a pigment, a pigment dispersant, and a specific amount of an alkylene oxide adduct having a polyamine structure with respect to the pigment in advance, and then dispersing the mixture into water, in a step of producing an aqueous pigment dispersion.

The ink for inkjet recording containing an alkylene oxide adduct having a polyamine structure is well-known (for example, refer to PTLs 2 and 3). PTL 2 discloses that solubility of dye is improved so as to contribute to improving storage stability, election stability, and continuous recordability. In addition, PTL 3 discloses that in the ink for inkjet recording which uses a pigment, it is possible to obtain ink for inkjet recording which is capable of coping with high definition image recording while maintaining good responsiveness during jetting at a high driving frequency and sticking resistance of a recording head at a high level without causing problems in curling of a recording medium containing cellulose.

However, in the PTLs, a method suitable for reducing the amount of the multivalent metal ions of the aqueous pigment dispersion is not particularly examined, and as a matter of fact, the method disclosed in Examples of PTL 3 did not completely solve the problem of the present application.

The present inventors of the present invention considered that since an alkylene oxide adduct having a polyamine structure has ethylenediamine as a main structure, it is possible to chelate the multivalent metal ion derived from the pigment so as to invalidate a function of the multivalent metal ion as an ion. In addition, the present inventors considered that as a method for maximizing the capability of chelating the multivalent metal ion, it is most effective to increase the contact probability between pigment particles and the alkylene oxide adduct having a polyamine structure at the time of production, and found a producing method for "producing a mixture containing a pigment, a pigment dispersant, and a specific amount of an alkylene oxide adduct having a polyamine structure with respect to the pigment in advance, and then dispersing the mixture into water, in a step of producing an aqueous pigment dispersion".

The alkylene oxide adduct having a polyamine structure has an alkylene oxide chain in the structure and has high affinity for water, and thus has low viscosity (several mPa·s at a 20 wt % aqueous solution) at the time of being diluted with water. However, since the intermolecular interaction of nitrogen atoms is strong, the viscosity is very high in a normal state of not being diluted with water (several thousand mPa·s). From this aspect, it was found that the alkylene oxide adduct having a polyamine structure can be preferably applied as a kneading solvent used in a kneading dispersion method for finely pulverizing pigment particles by applying a strong shearing force with a kneading machine particularly at the time of obtaining the mixture. Particularly, it was found that when the mixture is kneaded and dispersed with small amount of water or without water, and then wafer is added to a kneaded dispersion, it is possible to obtain an aqueous pigment dispersion in which a volume average particle diameter of a pigment is small and the number of big particles is reduced.

In other words, according to the present invention, there is provided a method for producing an aqueous pigment dispersion including a step of dispersing a mixture containing a pigment, an anionic group-containing organic polymer compound, a basic compound, and from 1% to 500 mass % of alkylene oxide adduct having a polyamine structure with respect to the pigment into water.

In addition, according to the present invention, there is provided an aqueous ink for inkjet recording in which an aqueous pigment dispersion obtained by using the producing method is used.

Advantageous Effects of Invention

According to the producing method of the present invention, it is possible to obtain an aqueous pigment dispersion having a small volume average particle diameter of a pigment. In addition, it is possible to obtain an aqueous ink in which the number of big particles is reduced by using the aqueous pigment dispersion obtained according to the present invention.

It is considered that since the alkylene oxide adduct having a polyamine structure has ethylenediamine as a main structure, the multivalent metal ion derived from the pigment is chelated so as to invalidate the function of the multivalent metal ion as an ion. There is a concern that the multivalent metal ion not only forms a water insoluble salt along with a surfactant or the like added to ink as described above, but also crosslinks a resin adsorbed to a pigment surface to form secondary aggregates of the pigment particles. However, since it is considered that the alkylene oxide adduct having a polyamine structure functions as an aggregation inhibitor with respect to a resin by chelating the multivalent metal ion, it is presumed that it is possible to drastically reduce the number of big particles which may be produced and to disaggregate already formed aggregates, and as a result, the volume average particle diameter of the pigment can be reduced.

The chelating capability of the multivalent metal ion is enhanced as the contact probability between the pigment particles and the alkylene oxide adduct having a polyamine structure is increased. Particularly, in an initial stage of a producing method for mixing a pigment and an anionic group-containing organic polymer compound, it is effective to knead the mixture containing water equal to or less than 50% by mass with respect to a solid content thereof or not containing water.

The alkylene oxide adduct having a polyamine structure used in the present invention has no influence on the ink properties even when it is present in the ink, and thus is not necessary to be removed in the producing step unlike a particle having a chelate forming group or a fibrous resin, and is capable of greatly shortening the time for the producing steps of the aqueous pigment dispersion and the aqueous ink.

DESCRIPTION OF EMBODIMENTS

Definition of Terms

In the present invention, an aqueous pigment dispersion refers to a dispersion in which a pigment is dispersed into water which is a dispersion medium at a high concentration before being formed into an aqueous ink.

The pigment concentration of the aqueous pigment dispersion is normally adjusted to be 5% to 50% by mass. In making the aqueous pigment dispersion into ink, the ink can be obtained by simply diluting the aqueous pigment dispersion with water or an additive added in accordance with desired applications and physical properties such that the pigment concentration is 0.1% to 20% by mass.

(Pigment)

The pigments used in the present invention are at least a kind of pigment selected from conventionally known organic pigments or inorganic pigments. In addition, any of untreated pigments and treated pigments can be used in the present invention. Specifically, it is possible to use known organic pigments or inorganic pigments which can be dispersed into water and a water-soluble organic solvent. Examples of the inorganic pigment include iron oxide, and carbon black produced by a known method such as a contact method, a furnace method, and a thermal method. In addition, examples of the organic pigment include an azo pigment (such as azo lake, an insoluble azo pigment, a condensed azo pigment, and a chelate azo pigment), a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), dye chelate (such as basic dye type chelate and acidic dye type chelate), a nitro pigment, a nitroso pigment, and aniline black.

Examples of the pigment used for a black ink include carbon black such as No. 2300, No. 2200B, No. 995, No. 990, No. 900, No. 960, No. 980, No. 33, No. 40, No, 45, No. 45L, No. 52, HCF 88, MA 7, MA 8, and MA 100, which are manufactured by Mitsubishi Chemical Corporation; Raven 5750, Raven 5250, Raven 5000, Raven 3500, Raven 1255, and Raven 700, which are manufactured by Columbia; Regal 400R, Regal 330R, Regal 660R, Mogul L, Mogul 700, Monarch 800, Monarch 880, Monarch 900, Monarch 1000, Monarch 1100, Monarch 1300, and Monarch 1400, which are manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 1400U, Special Black 6, Special Black 5, Special Black 4, Special Black 4A, NIPEX 150, NIPEX 160, NIPEX 170, NIPEX 180, NIPEX 95, NIPEX 90, NIPEX 85, NIPEX 80, and NIPEX 75, which are manufactured by Evonik Degussa Gmbh.

In addition, specific examples of the pigment used in a yellow ink include C.I. Pigment Yellows 1, 2, 12, 13, 14, 16, 17, 73, 74, 75, 83, 93, 95, 97, 98, 109, 110, 114, 120, 128, 129, 138, 150, 151, 154, 155, 174, 180, and 185.

In addition, specific examples of the pigment used in a magenta ink include C.I. Pigment Reds 5, 7, 12, 48 (Ca), 48 (Mn), 57 (Ca), 57:1, 112, 122, 123, 146, 150, 168, 176, 184, 185, 202, 209, 213, and 232, and C.I. Pigment Violet 19.

In addition, specific examples of the pigment used in a cyan ink include C.I. Pigment Blues 1, 2, 3, 15, 15:3, 15:4, 15:6, 16, 22, 60, 63, and 66.

Further, a dispersed particle diameter of the pigment after performing a dispersing treatment is preferably equal to or smaller than 1 µm, is further preferably 10 nm to 200 nm, and is most preferably 50 nm to 170 nm. In addition, the pigment may be a solid, or two or more kinds of pigments may be used in combination.

In addition, a self-dispersible pigment may be used. The self-dispersible pigment means a pigment which can be dispersed in an aqueous medium without a dispersant. Here, the phrase "dispersed or dissolved in an aqueous medium without a dispersant." means a state where a pigment is stably present in an aqueous medium by a hydrophilic group of a surface of the pigment without using a dispersant so as to disperse a pigment. Here, the phrase "stably present in an aqueous medium" means being stably present in water (25° C., 10% by weight of solid content) for 90 days (a particle diameter change width of a pigment is within +/−30%) without a dispersant.

The hydrophilic group is preferably one or more hydrophilic groups selected from the group consisting of —OM, —COOM, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$, that is, preferably an anionic hydrophilic functional group. Note that, in the formulae, M's each independently represent a hydrogen atom, an alkali metal, an ammonium, a phenyl group which may have a substituent, or an organic ammonium. In addition, in the formulae, R's each independently represent an alkyl group having 1 to 12 carbon atoms or an aryl group which may have a substituent.

The self-dispersible pigment is produced by, for example, performing a physical treatment or a chemical treatment on a pigment such that the hydrophilic group is bonded (grafted) to the surface of the pigment. Examples of the physical treatment include a vacuum plasma treatment. In addition, examples of the chemical treatment include a wet oxidation method which oxidizes by oxidizing agent in water and a method in which a p-aminobenzoic acid is bonded to a surface of a pigment so as to bond to a carboxyl group via a phenyl group thereto.

The self-dispersible pigment obtained by using a pigment treated by using, for example, methods disclosed in JP-A-8-3498, JP-T-2000-513396, JP-T-2008-524400, JP-T-2009-515007, JP-T-2010-537006, JP-T-2012-500866, and the like can be used. As a raw material of the self-dispersible pigment, any of inorganic pigments and organic pigments can be used.

As the pigment used in the present invention, any of dry powder and wet cake can be used. In addition, these pigments may be used alone, and two or more types thereof may be used in combination.

As the pigment used in the present invention, a pigment having a primary particle diameter of equal to or smaller than 25 µm is preferable, and a pigment having a primary particle diameter of equal to or smaller than 1 µm is particularly preferable. When the particle diameter is within the range, the pigment is less likely to be deposit and thus pigment dispersibility becomes excellent.

With respect to the particle diameter, a value measured by means of a transmission electron microscope (TEM) or a scanning electron microscope (SEM) can be applied.

In the present invention, using an organic pigment in which a large amount of multivalent metal ions are contained in a coarse pigment is particularly useful. In addition, pigments which contain a metal in a large amount and cannot be used for inkjet applications can also be used in the producing method of the present invention.

(Anionic Group-Containing Organic Polymer Compound)

Examples of an anionic group-containing organic polymer compound of the present invention include an organic polymer compound containing a carboxyl group, a sulfonic acid group, or a phosphoric acid group. Examples of such an anionic group-containing organic polymer compound include a polyvinyl resin having an anionic group, a polyester resin having an anionic group, an amino resin having an anionic group, an acrylic copolymer having an anionic group, an epoxy resin having an anionic group, a polyurethane resin having an anionic group, a polyether resin having an anionic group, a polyamide resin having an anionic group, an unsaturated polyester resin having an anionic group, a phenol resin having an anionic group, a silicone resin having an anionic group, and a fluorine polymer compound having an anionic group.

Among them, an acrylic copolymer having an anionic group and a polyurethane resin having an anionic group are preferable from the viewpoint that materials are abundant and easy to design, and a pigment dispersing function is excellent.

(Acrylic Copolymer Having Anionic Group)

Specific examples of an acrylic copolymer having an anionic group include a copolymer of a monomer having an anionic group such as (meth)acrylic acid and another ethylenically unsaturated monomer copolymerizable with the monomer. Note that, the (meth)acrylic acid in the present invention means a generic name of an acrylic acid and a methacrylic acid. Various esters of (meth)acrylic acid are also interpreted in the same manner as described above.

From the viewpoint that the copolymer can be made more strongly adsorb to the surface of the pigment by increasing the hydrophobicity of the copolymer more than the same acid value, examples of the other copolymerizable ethylenically unsaturated monomers include styrene, alkyl styrene such as α-methyl styrene, β-methyl styrene, 2,4-dimethyl styrene, α-ethyl styrene, α-butyl styrene, α-hexyl styrene, halogenated styrene such as 4-chlorostyrene, 3-chlorostyrene, and 3-bromostyrene, and preferably include a styrene monomer such as 3-nitrostyrene, 4-methoxystyrene, and vinyltoluene, and (meth)acrylate ester monomer having a benzene ring such as benzyl (meth)acrylate, phenyl (meth) acrylate, phenylethyl (meth)acrylate, phenylpropyl (meth) acrylate, and phenoxyethyl (meth)acrylate. Among them, a styrene monomer such as styrene, α-methylstyrene and tert-butylstyrene is particularly preferable.

The copolymer in the present invention may be a copolymer containing a polymerization unit of the (meth)acrylic acid and a polymerization unit of other copolymerizable ethylenically unsaturated monomers as essential polymerization units, and may be binary copolymers thereof may be used, or ternary or higher multi-copolymers with other copolymerizable ethylenically unsaturated monomers may be used.

Examples of the ethylenically unsaturated monomer include acrylic esters and methacrylic esters such as methyl acrylate, methyl methacrylate, n-propyl acrylate, isopropyl acrylate, n-butyl acrylate, sec-butyl acrylate, tert-butyl acrylate, 2-ethyl butyl acrylate, 1, 3-dimethyl butyl acrylate, hexyl acrylate, 2-ethyl hexyl acrylate, octyl acrylate, ethyl methacrylate, n-butyl methacrylate, 2-methyl butyl methacrylate, pentyl methacrylate, heptyl methacrylate, maleic acid, maleic anhydride, and nonyl methacrylate; acrylic acid ester derivatives and methacrylic acid ester derivatives such as 3-ethoxypropyl acrylate, 3-ethoxybutyl acrylate, dimethyl aminoethyl acrylate, 2-hydroxyethyl acrylate, 2-hydroxybutyl acrylate, ethyl-α-(hydroxymethyl) acrylate, dimethyl aminoethyl methacrylate, hydroxyethyl methacrylate, hydroxypropyl methacrylate; acrylic acid aryl esters and acrylic acid aralkyl esters such as phenyl acrylate, benzyl acrylate, phenylethyl acrylate, phenylethyl methacrylate; monoacrylic esters or monomethacrylic esters of polyhydric alcohol such as diethylene glycol, triethylene glycol, polyethylene glycol, glycerin, bisphenol A; maleic acid dialkyl esters such as dimethyl maleate, diethyl maleate; and vinyl acetate. One kind or two or more kinds of these monomers can be added as a monomer component.

The copolymer used in the present invention may be a linear copolymer which only contains a polymerization unit of a monoethylenically unsaturated monomer, or may be a copolymer containing a partially linked portion obtained by copolymerization using an ethylenically unsaturated monomer having various crosslinking properties in an extremely small amount.

Examples of such an ethylenically unsaturated monomer having the crosslinking properties include glycidyl (meth) acrylate and divinylbenzene; and poly(meth)acrylate of polyhydric alcohol such as ethylene glycol di(meth)acrylate, propylene glycol di(meth)acrylate, polyethylene glycol di(meth)acrylate, poly(oxyethylene oxypropylene) glycol di(meth)acrylate, and tri(meth)acrylate of an alkylene oxide adduct of glycerin.

In the present invention, assuming that reaction rates and the like of the monomers to be used are substantially the same, a charge ratio of each monomer is regarded as a content ratio in terms of mass of the polymerization unit of each monomer. The copolymer in the present invention can be synthesized by various conventionally known reaction methods such as bulk polymerization, solution polymerization, suspension polymerization, and emulsion polymerization. At this time, a polymerization initiator, a chain transfer agent (a polymerization degree adjusting agent), a surfactant, and a defoaming agent which are conventionally known can be used in combination.

As the anionic group-containing organic polymer compound used in the present invention, among the copolymers, for example, a styrene acrylic copolymer containing a styrene monomer and a (meth)acrylic acid as a raw material monomer, such as a styrene-(meth)acrylic acid copolymer and a styrene-(meth)acrylic ester-(meth)acrylic acid copolymer, is particularly preferable (note that, "styrene acrylic copolymer" in the present invention means "copolymer containing a styrene monomer and a (meth)acrylic acid as a raw material monomer" as described above. Accordingly, general-purpose monomers other than a styrene monomer and a (meth)acrylic acid may be copolymerized).

The usage ratio of the styrene monomer which is a raw material of the styrene acrylic copolymer is further preferably 50% to 95% by mass, and is particularly preferably 70% to 90% by mass. When the usage ratio of the styrene monomer is equal to or greater than 50% by mass, affinity of styrene acrylic copolymer for a pigment is excellent, and the dispersion stability of the aqueous pigment dispersion tends to be improved. In addition, plain paper recording properties of the aqueous ink for inkjet recording obtained from the aqueous pigment dispersion is improved, the image recording density tends to be high, and the water resistance also tends to be excellent. When the amount of the styrene monomer is within the range of equal to or less than 90% by mass, if is possible to maintain the excellent dispersibility with respect to the aqueous medium of the pigment which is coated with the styrene acrylic copolymer, and thereby it is possible to improve the pigment dispersibility and the dispersion stability in the aqueous pigment dispersion. Further, the printing stability in the case where the styrene monomer is used as an ink composition for inkjet recording becomes excellent.

The styrene acrylic copolymer can be obtained by copolymerizing a styrene monomer and at least one of an acrylic acid monomer and a methacrylic acid monomer, and an acrylic acid and a methacrylic acid are preferably used in combination. The reason for this is that when the copolymerizability at the time of resin synthesis is improved, the uniformity of the resin is improved, and as a result, the storage stability is improved, and more finely particulated pigment dispersion liquid tends to be obtained.

A total sum at the time of copolymerizing the styrene monomer, and the acrylic acid monomer and the methacrylic acid monomer in the styrene acrylic copolymer is preferably equal to or greater than 80% by mass with respect to the entire monomer components.

As the method for producing the styrene acrylic copolymer, a typical polymerization method can be used, and examples thereof include a method for conducting a polymerization reaction in the presence of a polymerization catalyst such as solution polymerization, suspension polymerization, and bulk polymerization. Examples of the polymerization catalyst include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, and butyl peroxybenzoate, and the use amount thereof is preferably from 0.1% to 10.0% by mass of the monomer component.

In addition, the styrene acrylic copolymer may be a random copolymer, or may be a graft copolymer. Examples of the graft copolymer include a graft copolymer in which a copolymer of nonionic monomer copolymerizable with styrene or polystyrene and styrene is a trunk or branch, and a copolymer of other monomers containing an acrylic acid, a methacrylic acid, and styrene is a branch or trunk. The styrene acrylic copolymer may be a mixture of the graft copolymer and the random copolymer.

In the present invention, the weight average molecular weight of the acrylic copolymer having an anionic group is preferably 2,000 to 40,000. For example, even in the case of using the styrene acrylic copolymer, the weight average molecular weight thereof is preferably 5,000 to 30,000, is further preferably 5,000 to 20,000, and is particularly preferably 5,500 to 15,000. Here, the weight average molecular weight means a value measured according to a gel permeation chromatography (GPC) method, and is a value converted into the molecular weight of polystyrene used as a standard substance.

In the case where the anionic group-containing organic polymer compound used in the present invention is a styrene acrylic copolymer, the styrene acrylic copolymer has a carboxyl group derived from an acrylic acid monomer and a methacrylic acid monomer, and an acid value of the carboxyl group is preferably 20 to 400 (mgKOH/g), and is further preferably 50 to 300 (mgKOH/g). When the acid value is equal to or less than 300 (mgKOH/g), the pigments tend to be hardly aggregated.

The term of the acid value means a numerical value measured based on JIS K 0070: 1992, "Test methods for acid value, saponification value, ester value, iodine value, hydroxyl value, and unsaponifiable matter of chemical products", and this is the amount (mg) of potassium hydroxide necessary for completely neutralizing 1 g of a resin.

In the case where the acid value is excessively low, the pigment dispersion and the storage stability are deteriorated, and the printing stability is deteriorated in the case where the aqueous ink for inkjet recording to be described below was prepared, and thus the excessively low acid value is not preferable. In the case where the acid value is excessively high, the water resistance of a colored recorded image is deteriorated, and thus the excessively high acid value is not preferable as well. In order to make the copolymer within the range of the acid value, copolymerization may be performed with incorporating (meth)acrylic acid such that the acid value is within the range.

(Urethane Resin Having Anionic Group)

Specific examples of a urethane resin having an anionic group used in the present invention include a urethane resin obtained by reacting a polyol having an anionic group such as a carboxy group or a sulfonic acid group, a polyisocyanate, and if necessary, a polyol having no anionic group for general purpose or a chain extender.

Examples of the polyol having a carboxy group used in the present invention include an ester obtained by reaction of polyhydric alcohol with polybasic acid anhydride, a dihydroxyalkanoic acid such as 2,2-dimethylol lactic acid, 2, 2-dimethylol propionic acid, 2, 2-dimethylol butanoic acid, and 2,2-dimethylol valeric acid. Preferred examples of the compound include 2,2-dimethylolpropionic acid and 2,2-dimethylolbutanoic acid. Among them, dimethylol propionic acid, or dimethylol butanoic acid is preferable because of easy availability. In addition, examples of the polyol having a sulfonic acid group include a polyester polyol obtained by reacting a dicarboxylic acid such as 5-sulfoisophthalic acid, sulfoterephthalic acid, 4-sulfophthalic acid, 5-[4-sulfophenoxy] isophthalic acid, or a salt thereof with the low molecular weight polyol.

Examples of the diisocyanate used in the present invention include an aliphatic diisocyanate compound such as hexamethylene diisocyanate and 2,2,4-trimethyl hexamethylene diisocyanate, an alicyclic diisocyanate compounds such as isophorone diisocyanate, hydrogenated xylylene diisocyanate, and 4,4-cyclohexylmethane diisocyanate, an araliphatic diisocyanate compound such as xylylene diisocyanate and tetramethylxylylene diisocyanate, and an aromatic diisocyanate such as toluylene diisocyanate and phenyl methane diisocyanate. Among them, an aliphatic diisocyanate compound or an alicyclic diisocyanate is preferred from the viewpoint that discoloration of printed images due to exposure to light hardly occurs.

In addition, the polyol having no anionic group for general purpose include polyester polyol, polyether polyol, polyhydroxy polycarbonate, polyhydroxy polyacetal, polyhydroxy polyacrylate, polyhydroxy polyester amide, and polyhydroxy polythioether. Among them, polyester polyol, polyether polyol, and polyhydroxy polycarbonate are preferable. One kind of these polyols may be used for reaction, or several kinds may be mixed and used for reaction.

In addition to the polyol, a low molecular weight diol may be appropriately used in combination for the purpose of adjusting the film hardness of the printed matter. Examples thereof include ethylene glycol, diethylene glycol, propylene glycol, dipropylene glycol, 1,2-propanediol, 1,3-propanediol, and 1,4-butanediol.

Examples of the chain extender used in the present invention include diols such as ethylene glycol, propylene glycol, 1,4-butanediol, 1,6-hexanediol, 1,9-nonanediol, 1,4-bis(β-hydroxyethoxy) benzene, 1,4-cyclohexanediol, and xylylene glycol, diamines such as polyamine, propylenediamine, xylylenediamine, isophoronediamine, 4,4'-diaminodiphenyl methane, tolylenediamine, and 4,4'-diaminodicyclohexyl methane. These can be used alone or two or more kinds thereof can be used in combination.

The methane resin is obtained by causing the polyol and the polyisocyanate to react with each other in the absence of a solvent or in the presence of an organic solvent. Then, when the urethane resin having an anionic group formed by neutralizing with the basic compound is mixed into the aqueous medium such that the urethane resin becomes aqueous, if necessary, a chain extender is mixed to and reacts with the urethane resin.

In the reaction of polyol and polyisocyanate, an equivalent ratio of an isocyanate group of the polyisocyanate to a hydroxyl group of the polyol is preferably 0.8 to 2.5, and is further preferably 0.9 to 1.5.

In the present invention, the weight average molecular weight of the urethane resin having an anionic group is preferably 5,000 to 500,000, is further preferably 10,000 to 200,000, and is particularly preferably 15,000 to 100,000.

Here, the weight average molecular weight is a value obtained according to a gel permeation chromatography (GPC) method, and is a value converted into molecular weight of polystyrene used as a standard substance.

In addition, it is preferable to use the urethane resin having an acid value of 2 to 200 (mgKOH/g), and the acid value is preferably 2 to 100 (mgKOH/g) from the viewpoint of improving excellent water dispersion stability of the urethane resin.

The term of the acid value means a numerical value measured based on JIS K 0070: 1992, "Test methods for acid value, saponification value, ester value, iodine value, hydroxyl value, and unsaponifiable matter of chemical products", and this is the amount (mg) of potassium hydroxide necessary for completely neutralizing 1 g of a resin.

In the case where the acid value is excessively low, the pigment dispersion and the storage stability may be deteriorated, in the case where the acid value is excessively high, the water resistance of the formed image may be deteriorated. In order to make the copolymer within the range of the acid value, copolymerization may be performed by incorporating a polyol having a carboxy group such that the acid value is within the range.

(Basic Compound)

The basic compound of the present invention is used for the purpose of neutralizing an anionic group of the anionic group-containing organic polymer compound. As the basic compound, known basic compounds can be used, and examples thereof include a hydroxide of alkali metal such as potassium and sodium; a carbonate of alkali metal such as potassium and sodium; a carbonate of alkaline earth metal such as calcium and barium; an inorganic basic compound such as ammonium hydroxide, an amino alcohol such as triethanolamine, N,N-dimethanolamine, N-aminoethyl ethanolamine, dimethyl ethanolamine, N—N-butyl diethanolamine, a morpholine such as morpholine, N-methyl morpholine, and N-ethyl morpholine, and an organic basic compound of piperazine such as N-(2-hydroxyethyl) piperazine and piperazine hexahydrate. Among them, alkali metal hydroxide represented by potassium hydroxide, sodium hydroxide, or lithium hydroxide is preferable from the viewpoint of the low viscosity of the aqueous pigment dispersion, and the discharge stability of the ink for inkjet recording, and potassium hydroxide is particularly preferable.

With respect to the neutralization performed using the basic compound, the neutralization rate of the anionic group is not particularly limited, and is generally from 80% to 120%. Note that, the neutralization ratio in the present invention means a numerical value which indicates the percentage of the amount of the basic compound necessary for neutralization of all of the carboxyl groups in the anionic group-containing organic polymer compound, and is calculated by the following formula.

Neutralization ratio (%)=[{mass (g) of basic compound×56.11×1000}/{acid value (mgKOH/g) of resin×equivalent of basic compound×resin amount (g)}]×100 [Math. 1]

In the present application, it is preferable to consider the amount of water at the time of dispersing the pigment. In this case, since the basic compound is usually added as an aqueous solution, the amount of water is determined in consideration of the water of the aqueous basic compound solution.

(Alkylene Oxide Adduct Having Polyamine Structure)

The alkylene oxide adduct having a polyamine structure is a conventionally known compound obtained by performing addition reaction of an alkylene oxide on a polyethylene polyamine. For example, it is possible to use a compound represented by General Formula (1).

[Chem. 1]

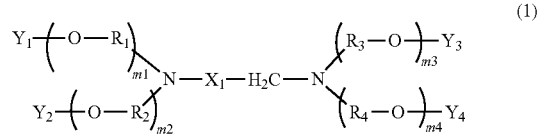

(1)

In General Formula (1), $R_1$ to $R_4$ each independently represents an alkylene group having 1 to 8 carbon atoms which may be branched, $Y_1$ to $Y_4$ each independently represent a hydrogen atom or an alkyl group having 1 to 10 carbon atoms, m1 to m4 each independently represent an integer of 0 to 5, $X_1$ each independently represents one of the following groups or a group in which plural of the following groups connect each other:

[Chem. 2]

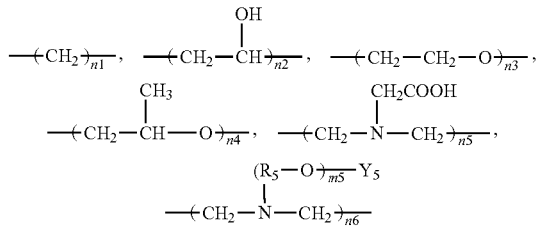

(where n1 to n6 each independently represent an integer of 0 to 10, $R_5$ each independently represents an alkylene group having 1 to 8 carbon atoms which may be branched, $Y_5$'s each independently represent a hydrogen atom, or an alkyl group having 1 to 10 carbon atoms, and m5's each independently represent an integer of 0 to 5), and the average value of the sum of m1 to m5 is 1 to 20. Among them, the average value of the sum of m1 to m5 is preferably 1 to 10, is further preferably 1 to 6, is most preferably 1 to 4.

In General Formula (1), a group represented by Y—(O—$R_X$)m- (here, X is an integer of 1 to 5) represents an added oxyalkylene group.

Specific examples of $R_1$ to $R_5$ include a methylene group, an ethylene group, an n-propylene group, an isopropylene group, an n-butylene group, an isobutylene group, an s-butylene group, a t-butylene group, a pentylene group, a hexylene group, a heptylene group, and an octylene group. Among them, an ethylene group and an isopropylene group are preferable, and a compound having at least an isopropylene group is further preferable.

Specific examples of the $Y_1$ to $Y_5$ include a methyl group, an ethyl group, an n-propyl group, an isopropyl group, an n-butyl group, an isobutyl group, a s-butyl group, a t-butyl group, a pentyl group, a hexyl group, a cyclohexyl group, a heptyl group, an octyl group, a nonyl group, and a decyl group. Among them, a hydrogen atom, a methyl group, and an ethyl group are preferable, and a hydrogen atom is further preferable.

m1 to m5 each represents the number of moles of added oxyalkylene group and a positive number of 0 to 5, and the average value of the sum of m1 to m5 is 1 to 20. Here, the average value of the sum of m1 to m5 represents that of the total number of oxyalkylene groups in one molecule. That is, an alkylene oxide adduct having a polyamine structure has at least one oxyalkylene group in one molecule. Among them, the average value of the sum is preferably 2 to 10, and is most preferably 4 to 8.

In General Formula (1), a group represented by N—$X_1$—$CH_2$—N is polyamine.

Among them, the compounds represented by General Formulae (2) to (10) can be used as the compound represented by General Formula (1). In General Formulae (2) to (10), $R_1$ to $R_4$, $Y_1$ to $Y_4$, and m1 to m4 are represent the same groups as those in General Formula (1), respectively, and the average value of the sum of m1 to m5 is 1 to 20.

[Chem. 3]

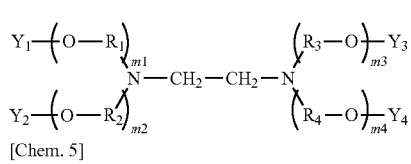
(2)

[Chem. 4]

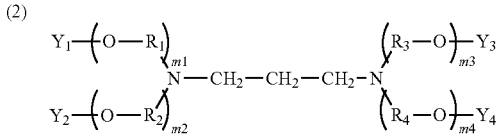
(3)

[Chem. 5]

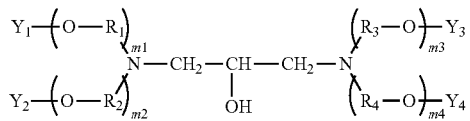
(4)

[Chem. 6]

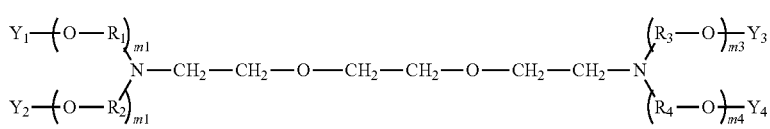
(5)

[Chem. 7]

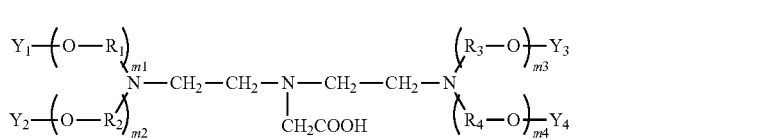
(6)

[Chem. 8]

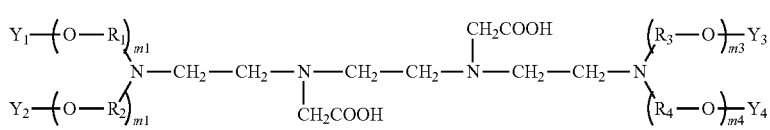
(7)

[Chem. 9]

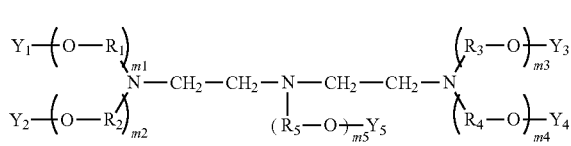
(8)

[Chem. 10]

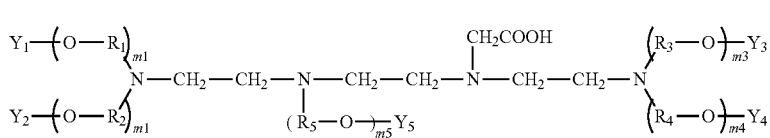
(9)

[Chem. 11]

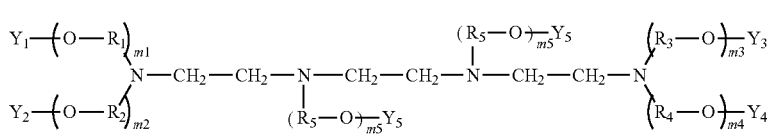
(10)

Among them, from the viewpoint that the chelating ability is high, compounds represented by General Formula (2), General Formula (3), or General Formula (4) are preferable, and compounds represented by General Formula (2) are particularly preferable from the viewpoint that it has high chelating ability and can suitably function as a kneading solvent during kneading.

The addition reaction of the alkylene oxide may be performed according to a conventionally known method, or can be performed by continuously adding the alkylene oxide under pressure to a compound having a nitrogen atom as a raw material at 50 to 200° C., 0.02 to 1.0 MPa in an inert gas atmosphere of argon or nitrogen gas, if necessary, in the presence of a catalyst. Examples of the catalyst include alkali catalyst, and it is possible to use an oxide or a hydroxide of an alkali metal and an alkaline earth metal, an alkyl amine such as alcoholate and triethylamine, an alkanolamine such as triethanolamine, and the like. Further, in addition to the alkali catalyst, a Lewis acid catalyst such as boron trifluoride or tin tetrachloride can be used. The use amount of the catalyst is generally from 0.01% to 5.0% by mass based on the mass after completion of addition reaction.

The alkylene oxide adduct having a polyamine structure chelates the multivalent metal ion, and the chelating capability depends on a structure of an oxyalkylene group, and there is a tendency that as the number of carbon atoms of the oxyalkylene group is increased, the chelating capability becomes higher. Table 1 indicates a relationship between an oxyalkylene group of the compound represented by General Formula (2) as the alkylene oxide adduct having a polyamine structure and the capability (chelating index) of chelating a calcium ion. As the calcium ion chelating index is high, the chelating capability becomes higher.

TABLE 1

| General Formula name | Polyamine structure | Oxyalkylene group | Calcium ion chelating index |
|---|---|---|---|
| General Formula (2)-1 | Ethylenediamine | $R_1$ to $R_4$: isopropylene group m1 to m4: 1 of each | 75 |
| General Formula (2)-2 | Ethylenediamine | $R_1$ to $R_4$: isopropylene group and ethylene group m1 to m4: 4 or 5 in total | 23 |
| General Formula (2)-3 | Ethylenediamine | $R_1$ to $R_4$: ethylene group m1 to m4: 1 of each | 18 |
| Water | — | — | 1 |

The chelating index of the multivalent metal ion of the alkylene oxide adduct having a polyamine structure means "a value obtained by dividing X by Y (X/Y) when a multivalent metal salt aqueous solution amount, which is measured at an end point when 1% by mass aqueous solution of multivalent metal salt (1% by mass aqueous solution of calcium chloride) is added dropwise to a blue aqueous solution obtained by adding 40% by mass aqueous solution of alkylene oxide adduct having a polyamine structure to the eriochrome black T, and then the aqueous solution exhibits red, is set as (X), and a multivalent metal salt aqueous solution amount, which is measured in the same way with pure water, is set as (Y)". More specifically, the chelating index of multivalent metal ion is measured by the following method.

(Method of Measuring Chelating Index of Multivalent Metal Ion)

An alkylene oxide adduct having a polyamine structure (for example, a compound of General Formula (2)-1 in Table 1 is diluted with pure water such that the solid content becomes 40% by mass, and then a sample which is sufficiently added until the eriochrome black T exhibits blue is prepared. The eriochrome black T is a kind of azo dyes, and is a metal indicator used for measuring the hardness of water and the like. It exhibits a blue color at pH 7 to 11, but if exhibits red color by forming a complex with metal ion such as calcium ion and magnesium ion. When the pH is equal to or lower than 6, a red deposit is formed. Therefore, when the target sample is acidic, it is necessary to raise the pH of the aqueous solution from 7 to 11 with an appropriate base which does not affect the structure of the sample. In addition, when the pH is equal to or greater than 11, an orange deposit is formed. Therefore, when the target sample shows strong basicity, it is necessary to lower the pH of the aqueous solution to from 7 to 11 with an appropriate acid which does not affect the structure of the sample. Since the eriochrome black T has different coloring degrees depending on the pH of the sample, it is desirable to keep the pH of the sample in the appropriate acid or base.

While stirring the sample, 1% by mass aqueous solution of multivalent metal salt is added dropwise. In the present invention, "1% by mass aqueous solution of calcium chloride" was used. When the multivalent metal salt is added dropwise, the concentration of the multivalent metal ions in the system becomes higher, and thus the eriochrome black T forms a complex with the multivalent metal ion, and exhibits red. However, if the compound in the sample has an ability of chelating the multivalent metal ion, the multivalent metal ion bonds to an unshared electron pair of the nitrogen atom in the compound, and thus the eriochrome black T remains to exhibit blue. When the concentration of the multivalent metal ions is in the vicinity of the chelation limit, the eriochrome black T starts to exhibit violet, and when the concentration of the multivalent metal ions goes beyond the chelation limit, red is exhibited. This point of time is determined as an end point. At this time, as the ability of chelating the multivalent metal ion is strong, an aqueous solution of a large amount of multivalent metal salts is required until the eriochrome black T exhibits red. The amount of aqueous solution of multivalent metal salt added dropwise until the end point is measured. This amount was measured three times, and the average value was set as (X).

The same test was performed with pure water which does not contain a sample, and the amount of aqueous solution of multivalent metal salt added dropwise until the end point is measured. This amount was measured three times, and the average value was set as (Y).

The value (X/Y) obtained by dividing X by Y is denoted by the chelating index of the multivalent metal ion of the alkylene oxide adduct having a polyamine structure.

In this case, when there is no special provision, it is necessary that the difference between the measured value and the average value does not exceed 2 in the last digit of the required numerical value.

As apparent from Table 1, the compound of General Formula (2)-1 to General Formula (2)-3, which is an alkylene oxide adduct having a polyamine structure indicates higher index than water, and thus it can be said that the compound has an ability of chelating the calcium ion. In the present invention, the chelating index of the calcium ion is preferably equal to or greater than 5 and is further preferably equal to or greater than 10.

In the producing method of the present invention, as described above, an alkylene oxide adduct having a polyamine structure has two roles, that is, a role of chelating the multivalent metal ions derived from a pigment as a multivalent metal ion chelating agent, and a role of finely particulating a pigment as a kneading solvent at the time of producing an aqueous pigment dispersion which is a high viscosity liquid (several thousand mPa·s).

Typically, examples of the kneading solvent include those having a high viscosity among water-soluble organic solvents to be described below, glycols such as ethylene glycol, diethylene glycol, triethylene glycol, tetraethylene glycol, propylene glycol, polyethylene glycol, and polypropylene glycol; diols such as butanediol, pentanediol, hexanediol, and their homologous diols; glycol esters such as propylene glycol laurate; glycol ethers such as ethers of diethylene glycol monoethyl, diethylene glycol monobutyl, and diethylene glycol monohexyl, and cellosolve including propylene glycol ether, dipropylene glycol ether, and triethylene glycol ether; and alcohols such as methanol, ethanol, isopropyl alcohol, 1-propanol, 2-propanol, 1-butanol, 2-butanol, butyl alcohol, pentyl alcohol, and their homologous alcohols; or sulfolane; lactones such as γ-butyrlolactone; lactams such as N-(2-hydroxyethyl) pyrrolidone; and glycerin and its derivatives; and polyoxyethylene benzyl alcohol ether. In addition, as a kneading solvent, described below, used in a kneading dispersion method for finely pulverizing pigment particles by applying a strong shearing force to a mixture containing a pigment with high solid content concentration using a kneading machine, a compound that can be used as a so-called wetting agent having a high wetting action on the pigment surface is preferable among the compounds used as the kneading solvent. Specific examples thereof include polyhydric alcohols having a high boiling point and low volatility such as glycols and diols, and particularly, it is possible to preferably use glycols such as diethylene glycol and triethylene glycol. The alkylene oxide adduct having a polyamine structure used in the present invention corresponds to the polyhydric alcohols having the high boiling point and the low volatility, and thus can be preferably used as a kneading solvent having high wet action.

After a mixture (at this time, water is preferably contained in a small amount or not to be contained) of a pigment and an alkylene oxide adduct having a polyamine structure is kneaded and dispersed, when water is added to the kneaded dispersion, it is possible to obtain an aqueous pigment dispersion in which the finely particulated pigment is stabilized in dispersion and the aggregates present at the time of preparing an aqueous ink are reduced. As a kneading machine used at this time, a kneading machine which is capable of imparting a strong share such as a planetary mixer is preferable, and it is expected that the contact probability between the pigment particles and the kneading solvent is increased. In addition, it is presumed that the temperature of the mixture in the middle of kneading and dispersing is very high, and thus the ionization of the multivalent metal adhering to the pigment surface is further promoted.

In addition, the alkylene oxide adduct having a polyamine structure has an oxyalkylene group, and thus has high affinity for water, and it has a low viscosity when being dissolved in water; however, the intermolecular interaction of nitrogen atoms is strong, and thus the viscosity thereof in a normal state is very high. With such properties, in addition to the kneading solvent, there is an action of improving a printing density by rapidly increasing the viscosity of the ink after paper landing and preventing the pigment from penetrating into the paper. In addition, when landing on the inkjet recording paper having a calcium chloride or calcium carbonate layer on a surface thereof, calcium on the paper surface and the alkylene oxide adduct having a polyamine structure are reacted, and the ink is thickened such that the pigment is prevented from penetrating into the paper, and thereby the printing density is improved.

It is also known that the alkylene oxide adduct having a polyamine structure has an effect of suppressing curling of paper. It is expected that the moisturizing effect of the alkylene oxide adduct having a polyamine structure is high, and thus dots are likely to spread in the horizontal direction (fiber direction) of the paper. The fact that a surface tension of a dispersion is deteriorated and thus a contact angle with cellulose becomes small is also a factor that the ink tends to spread in the fiber direction. The higher the concealing rate of the paper surface by the ink, the higher the printing density even with a small number of ink dots, and thus the ink which tends to spread in the fiber direction on the paper surface is advantageous from the viewpoint of improving the printing density. Also, it is possible to prevent the pigment from penetrating into the paper such that the ink can spread in the fiber direction on the paper surface, and thus it is possible to obtain a printed matter with high density which could not be achieved in the related art.

Regarding the ratio of the pigment to the alkylene oxide adduct having a polyamine structure at the time of being kneaded and dispersed, the alkylene oxide adduct having a polyamine structure is preferably 1% to 500% by mass, is further preferably 20% to 200% by mass, and is most preferably 60% to 150% by mass, with respect to the pigment.

In addition, in the case where the aqueous pigment dispersion using the alkylene oxide adduct having a polyamine structure is used for the aqueous ink for inkjet recording, the content of the alkylene oxide adduct having a polyamine structure is preferably equal to or less than 20% by mass in the ink. The alkylene oxide adduct having a polyamine structure has strong intermolecular interaction of nitrogen atoms, and thus the viscosity thereof is very high (several thousand mPa·s). The viscosity can be lowered by making it into an aqueous solution, but as the content of the ink is increased, the viscosity of the ink tends to be high. In addition, the surface tension of the ink tends to be decreased depending on the content. As a result, it becomes difficult to maintain stable ink ejection, and thereby there is a possibility that ejection becomes difficult depending on the inkjet head. Further, a mixture preferably contains water of equal to or less than 50% by mass with respect to the solid content or no water, and the amount of water is further preferably 1% to 20% by mass, is still further preferably 1% to 15% by mass, and is most further preferably 1% to 10% by mass.

(Water)

As the water used in the present invention, pure water such as ion exchange water, ultrafiltration water, reverse osmosis water, and distilled water, or ultrapure water can be used. In addition, the aqueous pigment dispersion, which is obtained by using water sterilized by ultraviolet irradiation or addition of hydrogen peroxide, and ink using the aqueous pigment dispersion are preferable from the viewpoint of preventing the occurrence of fungi or bacteria in the case of long-term storage.

(Water-Soluble Organic Solvent)

In the present invention, in addition to water, if necessary, a water-soluble organic solvent may be used in combination. Examples of the water-soluble organic solvent include ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1, 4-dioxane, and 1,2-dimethoxyethane; and amides such as dimethyl formamide, and N-methyl pyrrolidone. Among them, a compound selected from the group consisting of a ketone having 3 to 6 carbon atoms and an alcohol having 1 to 5 carbon atoms is preferably used.

Further, as described above, those having a high viscosity, namely, glycols such as ethylene glycol, diethylene glycol, triethylene glycol, tetraethylene glycol, propylene glycol, polyethylene glycol, and polypropylene glycol; diols such as butane diol, pentane diol, hexane diol, and their homologous diols; glycol esters such as propylene glycol laurate; glycol ethers such as ethers of diethylene glycol monoethyl, diethylene glycol monobutyl, and diethylene glycol monohexyl, and cellosolve including propylene glycol ether, dipropylene glycol ether, and triethylene glycol ether; and alcohols such as methanol, ethanol, isopropyl alcohol, 1-propanol, 2-propanol, 1-butanol, 2-butanol, butyl alcohol, pentyl alcohol, and their homologous alcohols; or sulfolane; lactones such as γ-butylrolactone; lactams such as N-(2-hydroxyethyl) pyrrolidone; and glycerin and its derivatives; and polyoxyethylene benzyl alcohol ether can also be used as a kneading solvent having high wetting action to be used at the time of producing a pigment dispersion.

The water-soluble organic solvents can be used alone or two or more types thereof can be used in combination. Among them, polyhydric alcohols having the high boiling point and the low volatility such as glycols and diols are preferably used as a kneading solvent, and glycols such as diethylene glycol and triethylene glycol are particularly preferable.

(Method for Producing Aqueous Pigment Dispersion)

The method for producing an aqueous pigment dispersion of the present invention includes a step of dispersing a mixture containing a pigment, an anionic group-containing organic polymer compound, a basic compound, and from 1% to 500% by mass of alkylene oxide adduct having a polyamine structure with respect to the pigment into water.

A step of obtaining the mixture is not particularly limited, and can be performed according to a well-known dispersion method. Examples of the well-known dispersion method include a media mill dispersion method which uses media such as a paint shaker, a bead mill, a sand mill, and a ball mill; a medialess dispersion method which uses an ultrasonic homogenizer, a high pressure homogenizer, a Nanomizer, an Ultimizer; a kneading dispersion method which uses a roll mill, a Henschel mixer, a pressure kneader, an intensive mixer, a Banbury mixer, and a planetary mixer. Among them, the kneading dispersion method is a method for finely pulverizing pigment particles by applying a strong shearing force to a mixture containing a pigment with high solid content concentration by means of a kneading machine, and is a method for preferably obtaining a kneaded material with high pigment concentration, and effectively reducing big particles. In the kneading dispersion method, it is preferable that water is equal to or less than 50% by mass with respect to the entire solid content, or is not contained.

In the case where the mixture is obtained according to the kneading dispersion method, it is preferable that water is contained in an amount of 50% by mass or less with respect to the entire solid content or water is not contained. When the water is present in a small amount or is not present, the alkylene oxide adduct having a polyamine structure which is a kneading solvent and the pigment are in directly contact with each other, and thus it is possible to expect a possibility of chelating much more multivalent metal ions present in the pigment, and a possibility of suppressing cross-linking aggregation of an anionic group-containing organic polymer compound which is a dispersing resin or re-dissolving the anionic group-containing organic polymer compound. In addition, in the kneading dispersion method, it is possible to expect a possibility that in general, the temperature of the kneaded material becomes high and thus ionization of multivalent metal is promoted in the system, and a possibility that the contact probability of the pigment particles and the alkylene oxide adduct having a polyamine structure becomes higher due to the strong shear.

In the kneading dispersion method, a mixture containing a pigment, an anionic group-containing organic polymer compound, a basic compound, and from 1% to 500% by mass of alkylene oxide adduct having a polyamine structure with respect to the pigment is prepared and kneaded.

The amount of the alkylene oxide adduct having a polyamine structure is preferably from 20% to 200% by mass, and is further preferably from 60% to 150% by mass, with respect to the pigment. In addition, the order of preparing at this time is not particularly limited, and kneading may be started by preparing the entire amount at the same time, each may be prepared little by little, or the preparing order may be changed depending on raw materials, for example, the polymer, the basic compound, and the pigment are charged first, and then the water-soluble organic solvent is charged. The amount of each raw material to be charged can be set within the above-mentioned range. Note that, since the basic compound is usually mixed in the form of an aqueous solution thereof, taking the water contained in the aqueous basic compound solution into account, the amount of water in the kneading and dispersing is determined.

In order to apply a strong shearing force which is a merit of the kneading dispersion method to the mixture, it is preferable to knead the mixture in a state where the solid content ratio of the mixture is high, so that a higher shearing force can be added to the mixture. The solid content ratio is preferably from 20% to 100% by mass, is further preferably from 30% to 90% by mass, and is most preferably from 40% to 80% by mass. When the solid content ratio is less than 20% by mass, the viscosity of the mixture is lowered, the kneading is not sufficiently performed, and the pigment may be insufficiently disintegrated. In addition, when the solid content ratio is increased as described above, pulverization of the pigment in the kneaded product and coating of the pigment with the anionic group-containing organic polymer compound can proceed simultaneously since the viscosity of the kneaded material is kept during kneading at a moderately high level and the load on the kneaded material from the kneading machine is increased during kneading.

The temperature at the time of kneading can be appropriately adjusted in consideration of the temperature properties such as a glass transition point of the anionic group-containing organic polymer compound used so that a sufficient shearing force is applied to the kneaded material. For example, in the case where the anionic group-containing organic polymer compound is a styrene acrylic copolymer, the kneading is preferably performed at the temperature lower than the glass transition point and in a temperature range where a temperature difference from the glass transition point is lower than 70° C. When the kneading is performed within the temperature range, there is no case where the shearing force is insufficient due to the decrease in the viscosity of the kneaded material in accordance with the melting of the resin with the rise in kneading temperature.

The kneading apparatus used in a kneading step may be any kneading apparatus as long as it is capable of generating a high shearing force for a mixture having a high solid content ratio, and it is possible to select and use from the known kneading apparatuses as described above; however, it is preferable to use a kneading apparatus which includes a stirring tank and a stirring blade and is capable of hermetically closing the stirring tank rather than an open type kneading machine having no stirring tank such as a twin roll. It is preferable to use a kneading apparatus including a stirring tank and a stirring blade. Examples of the devices include a Henschel mixer, a pressure kneader, a Banbury mixer, and a planetary mixer, and particularly, a planetary mixer is preferable. In the present invention, the kneading is preferably performed with a high pigment concentration and a high solid content concentration composed of a pigment and a resin, and thus the viscosity of the kneaded material is changed in a wide range depending on the kneading conditions of the kneaded material. Here, as compared with the twin roll, in the case of using the planetary mixer, the kneading treatment can be performed in a wide range of viscosity region, an aqueous medium can be added and vacuum distillation can be performed, and thus the viscosity and load shearing force during kneading can be easily adjusted.

In the kneading step, as a kneading solvent, a water-soluble organic solvent such as polyhydric alcohols, e.g., glycols and diols, may be used in combination. In this case, the ratio of the water-soluble organic solvent to be used in combination is preferably equal to or less than 80% by mass, is further preferably equal to or less than 50% by mass, and is most preferably equal to or less than 20% by mass, with respect to the total of the water-soluble organic solvent and the alkylene oxide adduct having a polyamine structure.

After Step 1 of obtaining the mixture according to the kneading dispersion method, for Step 2 of dispersing the kneaded material obtained in Step 1 into water, for example, when using a kneading apparatus which includes a stirring tank and a stirring blade and is capable of hermetically closing the stirring tank in Step 1, it is possible to add water in the kneading apparatus subsequently to Step 1. The water used in this case may be used alone, or in combination with the water-soluble organic solvent.

Although it depends on the application, generally, when the pigment concentration of the aqueous pigment dispersion obtained as described above is adjusted to be 10% to 50% by mass, the ink is easily diluted, and thus the pigment concentration is preferably in the range. In making the aqueous pigment dispersion into ink, the ink can be obtained by simply diluting the aqueous pigment dispersion, namely, by adding a water-soluble solvent and/or water, or an additive appropriately in accordance with desired applications and physical properties such that the pigment concentration is 0.1% to 20% by mass.

In addition, in the case where the viscosity is higher than the range and it is inconvenient to handle while the pigment concentration is adjusted to the range according to the above method, it is also possible to suitably perform dilution with an aqueous medium to obtain an aqueous pigment dispersion having a desired viscosity range.

Specifically, after a kneaded pigment material is produced by using the kneading machine including the stirring tank as described above, the kneaded pigment material may be directly diluted by adding an aqueous medium into the stirring tank and mixing, and if necessary, stirring, thereby producing an aqueous pigment dispersion. In addition, a solid pigment dispersion and an aqueous medium are mixed in another stirring machine including a stirring blade, and if necessary, the mixture is stirred, thereby producing an aqueous pigment dispersion.

Regarding the mixing with the aqueous medium, the necessary amount of the aqueous medium may be added all together to the kneaded pigment material, but in the case where the necessary amount is continuously or intermittently added and mixed, the dilution with the aqueous medium is efficiently performed, and it is possible to prepare an aqueous pigment dispersion in a shorter time. The dissolution time and heating temperature are not particularly limited, but in order to secure sufficient solubility of the kneaded material and uniformity of the dispersion to be obtained, it is preferably long time and high temperature to the extent that decomposition of the anionic group-containing organic polymer compound does not occur or the stability of the dispersion is not impaired.

In addition, the aqueous pigment dispersion obtained as described above may be further subjected to dispersion treatment with a dispersing machine. The dispersing machine used at this time is not particularly limited, and examples thereof include a paint shaker, a bead mill, a roll mill, a sand mill, a ball mill, a stirrer, a basket mill, a sand mill, a sand grinder, a dyno mill, a disperser mat, an SC mill, a spike mill, an agitator mill, a juice mixer, a high pressure homogenizer, an ultrasonic homogenizer, a nanomizer, a desolver, a disper, a high speed impeller dispersing machine, a kneader, and a planetary mixer.

(Aqueous Ink for Inkjet Recording)

The aqueous pigment dispersion is diluted to a desired concentration so as to be used in various applications in a coating field for automobiles and building materials, a printing ink field for an offset ink, a gravure ink, a flexo ink, and a silk screen ink, or an ink field for inkjet recording.

In the case where the aqueous pigment dispersion of the present invention is applied to the ink for inkjet recording, the water-soluble solvent and/or water, an anionic group-containing organic polymer compound serving as a binder, and the like are further added, and various kinds of additives such as a drying inhibitor, a penetrant, and a surfactant are added in accordance with the desired physical properties so as to prepare ink.

A step of centrifugal separation or a filtration treatment may be added during or after preparing the ink.

(Drying Inhibitor)

The drying inhibitor is added so as to prevent the ink from being dried. The content of the drying inhibitor in ink is preferably 3% to 50% by mass. The drying inhibitor used in the present invention is not particularly limited, and a drying inhibitor which is miscible with water and is effective to prevent clogging of the head of the ink jet printer is preferable. Examples thereof include glycerin, ethylene glycol, diethylene glycol, triethylene glycol, triethylene glycol mono-n-butyl ether, polyethylene glycol having a molecular weight of equal to or less than 2,000, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. Among them, a drying inhibitor containing glycerin and triethylene glycol is stable, and exhibits excellent effects of the ink drying properties and discharge performance.

Note that, as the drying inhibitor, the same compound as the kneading solvent used for the aqueous pigment dispersion can be used. Accordingly, in the case where the kneading solvent is already used for the aqueous pigment dispersion, it can serve as the drying inhibitor.

(Penetrant)

The penetrant is added for the purpose of improving permeability into the recording medium and adjusting a dot diameter on the recording medium.

Examples of the penetrant include lower alcohols such as ethanol and isopropyl alcohol; and glycol monoether of alkyl alcohol such as ethylene glycol hexyl ether, diethylene glycol butyl ether, and propylene glycol propyl ether. The content of the penetrant in the ink is preferably 0.01% to 10% by mass.

(Surfactant)

The surfactant is added so as to adjust the ink properties such as surface tension. The surfactant which can be added for the purpose is not particularly limited, and examples thereof include various kinds of anionic surfactants, a nonionic surfactant, a cationic surfactant, and an amphoteric surfactant. Among them, an anionic surfactant and a nonionic surfactant are preferable.

Examples of the anionic surfactant include alkyl benzene sulfonate, alkyl phenyl sulfonate, alkyl naphthalene sulfonate, higher fatty acid salt, sulfate ester salt of higher fatty acid ester, sulfonic acid salt of higher fatty acid ester, sulfuric acid ester salt and sulfonic acid salt of higher alcohol ether, higher alkyl sulfosuccinate, polyoxyethylene alkyl ether carboxylate, polyoxyethylene alkyl ether sulfate, alkyl phosphate, and polyoxyethylene alkyl ether phosphate, and specific examples thereof include dodecyl benzene sulfonate, isopropyl naphthalene sulfonate, monobutyl phenyl phenol monosulfonate, monobutyl biphenyl sulfonate, and dibutyl phenyl phenol disulfonate.

Examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, fatty acid alkylolamide, alkyl alkanol amide, acetylene glycol, an oxyethylene adduct of acetylene glycol, and a polyethylene glycol polypropylene glycol block copolymer. Among them, polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, an oxyethylene adduct of acetylene glycol, and a polyethylene glycol polypropylene glycol block copolymer are preferable.

Examples of other surfactants include a silicone surfactant such as a polysiloxane oxyethylene adduct; a fluorine surfactant such as perfluoroalkyl carboxylate, perfluoroalkyl sulfonate, and oxyethylene perfluoroalkyl ether; a biosurfactant such as a spiculisporic acid, rhamnolipid, and lysolecithin.

These surfactants can be used alone, or two or more kinds thereof can be used in combination. In the case of adding the surfactant, the amount of the surfactant added is preferably 0.001% to 5% by mass, is further preferably 0.001% to 1.5% by mass, and is still further preferably 0.01% to 1% by mass, with respect to the entire mass of the ink. When the amount of the surfactant added is less than 0.001% by mass, it is likely that the effect of adding the surfactant cannot be obtained, and when the amount of the surfactant added is greater than 5% by mass, a problem of image blur tend to occur.

In addition, if necessary, a preservative, a viscosity regulator, a pH adjuster, a chelating agent, a plasticizer, an antioxidant, an ultraviolet absorber, and the like can be added.

(Recording Medium)

The recording medium for aqueous ink for inkjet recording is not particularly limited, and it may be an absorbent-recording medium such as copy paper (PPC paper) generally used in a copying machine, a recording medium having an ink absorbing layer, a non-absorbent recording medium having no ink absorbency, and a hardly absorbent recording medium having low water absorbency of the ink.

Examples of the absorbent recording medium include plain paper, cloth, cardboard, and wood. Examples of the recording medium having an absorbing layer include inkjet recording paper. Specific examples thereof include Pictorico professional photo paper manufactured by Pictorico Co., Ltd.

As examples of the non-absorbent recording medium having no ink absorptivity, for example, those used for packaging materials for foods and the like can be used, and known plastic films can be used. Specific examples include a polyester film such as polyethylene terephthalate and polyethylene naphthalate, a polyolefin film such as polyethylene and polypropylene, a polyamide film such as nylon, a polystyrene film, a polyvinyl alcohol film, a polyvinyl chloride film, a polycarbonate film, a polyacrylonitrile film, and a polylactic acid film. Particularly, a polyester film, a polyolefin film, and a polyamide film are preferable, and polyethylene terephthalate, polypropylene, and nylon are further preferable. In addition, the film coated with polyvinylidene chloride or the like for imparting barrier properties may be used, and if necessary, a film having a laminated thereon a vapor deposition layer formed of a metal such as aluminum or a metal oxide such as silica or alumina may be used in combination.

The plastic film may be an unstretched film, or may be a film which is stretched in an axial direction or a biaxial direction. Further, the surface of the film may be untreated, but is preferably subjected to various treatments for improving adhesiveness, such as a corona discharge treatment, an ozone treatment, a low temperature plasma treatment, a frame treatment, and a glow discharge treatment.

The film thickness of the plastic film is appropriately changed depending on the applications, but in the case where soft packaging application, flexibility, durability, and curling resistance are required, and thus the film thickness is preferably 10 µm to 100 µm, and is further preferably 10 µm to 30 µm. Specific examples thereof include PYLEN (registered trademark) manufactured by TOYOBO Co., Ltd.

Examples of a hardly absorbent recording medium having low ink absorptivity include printing paper such as art paper, coated paper, lightweight coated paper, and finely coated paper. These hardly absorbent recording media are provided with a coating layer by coating the surface of cellulose-based high quality paper or neutral paper, which is generally not surface-treated, with a coating material, and examples thereof include other micro-coated paper such as "OK EVER LIGHT COAT" manufactured by OJI PAPER Co., Ltd. and "AURORA S" manufactured by Nippon paper Industries Co., Ltd., light weight coated paper (A3) such as "OK COAT L" manufactured by OJI PAPER Co., Ltd. and "AURORA L" manufactured by Nippon paper Industries Co., Ltd., coat paper (A2, B2) such as "OK TOP COAT+" manufactured by OJI PAPER Co., Ltd., and "AURORA COAT" manufactured by Nippon paper Industries Co., Ltd., and art paper (A1) such as "OK KANEFUJI+" manufactured by OJI PAPER Co., Ltd. and "TOKUBISHI ART" manufactured by Mitsubishi Paper Mills Ltd.

EXAMPLES

Hereinafter, the present invention will be described in more detail with reference to Examples, but the present invention is not limited by the following Examples. In the following examples, "parts" and "%" are on a mass basis unless otherwise specified.

(Anionic Group-Containing Organic Polymer Compound)

As an anionic group-containing organic polymer compound, a styrene acrylic resin was used. It a powdery resin (having a diameter of equal to or smaller than 1 mm) prepared by solution polymerization, in which a monomer composition ratio is styrene/acrylic acid/methacrylic acid=74/11/15 (mass ratio), a weight average molecular weight is 11000, and an acid value is 170 mgKOH/g.

Note that, the weight average molecular weight in the present invention means a value measured by using a gel permeation chromatography (GPC) method, and is a value converted into the molecular weight of polystyrene used as a standard substance. In addition, the measurement was performed with the following apparatuses and conditions.

Feed pump: LC-9A
System controller: SLC-6B
Auto injector: S1L-6B
Detector: RID-6A
The apparatuses are manufactured by SHIMADZU CORPORATION.
Data processing software: Sic480II Data station (manufactured by System Instruments)
Column: GL-R400 (Guard column)+GL-R440+GL-R450+GL-R400M (manufactured by Hitachi Chemical Co., Ltd.)
Elution solvent: tetrahydrofuran
Elution flow rate: 2 ml/min
Column temperature: 35° C.

(Examples and Comparative Examples of Aqueous Pigment Dispersion)

Example 1

(Step 1)

10.0 parts of styrene acrylic resin and 50.0 parts of "FASTOGEN Super Magenta RY (manufactured by DIC)" as a quinacridone pigment were put into a planetary mixer (Product name: Chemical Mixer ACM04LVTJ-B, manufactured by Aicohsha Manufacturing Co., Ltd.), a jacket was heated up to 60° C., and kneading was performed at a rotation speed of 80 rev/min and a revolution speed of 25 rev/min. In five minutes, 35.0 parts of compound (AO-1) (here, the compound (AO-1) is a compound represented by "General Formula (2)-1" of General Formula name in Table 1, and is a compound of General Formula (2) in which $R_1$ to $R_4$ are each an isopropylene group, m1 to m4 are each 1, and the sum of m1 to m4 is 4) as a kneading solvent and 5.0 parts of 34% by mass aqueous solution of potassium hydroxide were added as an alkylene oxide adduct having a polyamine structure.

Note that, the amount of water at this time was 5.3% by mass with respect to the solid content.

Kneading was continued until 60 minutes passed since a current value of a planetary mixer reached the maximum current value, and thereby a kneaded mixture was obtained.

[Chem. 12]

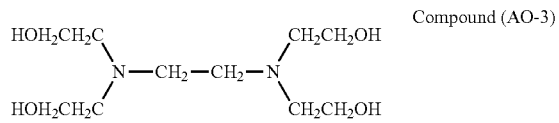

Compound (AO-1)

(Step 2)

80.0 parts of obtained kneaded mixture was taken out from the jacket, cut into a 1 cm square, and then was put into a commercially available juicer mixer. 80.0 parts of ion exchange water was added thereto, and the contents were mixed by the mixer for 10 minutes so that the kneaded mixture was diluted and dispersed in ion exchange water.

Further, the ion exchange water and the compound (AO-1) were added to obtain an aqueous pigment dispersion M-1 having a quinacridone pigment concentration of 15.5% by mass and a compound (AO-1) concentration of 15.5% by mass.

Example 2

An aqueous pigment dispersion M-2 was obtained in the same manner as in Example 1 except that a compound (AO-2) (here, the compound (AO-2) is a compound represented by "General Formula (2)-2" of General Formula name in Table 1, and is a compound represented by General Formula (2) in which $R_1$ to $R_4$ are each an isopropylene group, an ethylene group, or a group in which an isopropylene group and an ethylene group are linked, and the sum of m1 to m4 is 4 or 5) was used as an alkylene oxide adduct having a polyamine structure.

Example 3

An aqueous pigment dispersion M-3 was obtained in the same manner as in Example 1 except that a compound (AO-3) (here, the compound (AO-3) is a compound represented by "General Formula (2)-3" of General Formula name in Table 1, and is a compound represented by General Formula (2) in which $R_1$ to $R_4$ are each an ethylene group, m1 to m4 are each 1, and the sum of m1 to m4 is 4) was used as an alkylene oxide adduct having a polyamine structure.

[Chem. 13]

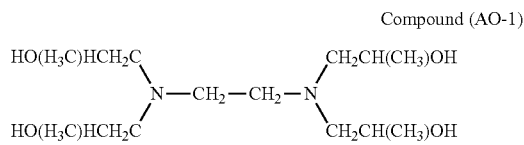

Compound (AO-3)

Example 4

An aqueous pigment dispersion R-1 was obtained in the same manner as in Example 1 except that an azo red pigment "FUJI FAST CARMINE 522 (manufactured by Fuji Pigment Co., Ltd.)" was used.

Example 5

An aqueous pigment dispersion B-1 was obtained in the same manner as in Example 1 except that a phthalocyanine blue pigment "FASTOGEN BLUE TGR (manufactured by DIC)" was used.

Example 6

An aqueous pigment dispersion Y-1 was obtained in the same manner as in Example 1 except that an azo yellow pigment "FAST YELLOW 7413 (manufactured by SANYO COLOR WORKS, Ltd.)" was used.

Comparative Example 1

An aqueous pigment dispersion M-4 was obtained in the same manner as in Example 1 except that triethylene glycol (abbreviation: TEG) was used instead of an alkylene oxide adduct having a polyamine structure as a kneading solvent.

Comparative Example 2

An aqueous pigment dispersion R-2 was obtained in the same manner as in Comparative Example 1 except that an azo red pigment "FUJI FAST CARMINE 522 (manufactured by Fuji Pigment Co., Ltd.)" was used.

Comparative Example 3

An aqueous pigment dispersion B-2 was obtained in the same manner as in Comparative Example 1 except that a phthalocyanine blue pigment "FASTOGEN BLUE TGR (manufactured by DIC)" was used.

Comparative Example 4

An aqueous pigment dispersion Y-2 was obtained in the same manner as in Comparative Example 1 except that an azo yellow pigment "FAST YELLOW 7413 (manufactured by SANYO COLOR WORKS, Ltd.)" was used.

(Examples and Comparative Examples of Aqueous Ink for Inkjet Recording)

Example 7

An aqueous ink A for inkjet recording having a pigment concentration of 4.0% by mass was prepared by mixing the following raw materials into the aqueous pigment dispersion M-1 obtained in Example 1.

(Aqueous Ink A for Inkjet Recording)
  Aqueous pigment dispersion M-1: 25.8 parts
  2-pyrrolidinone: 8.0 parts
  Triethylene glycol: 4.0 parts
  Triethylene glycol mono-n-butyl ether: 8.0 parts
  Purified glycerin: 3.0 parts
  Surfynol 440 (manufactured by Air Products and Chemicals, Inc.): 0.5 parts
  Phosphate surfactant: 1.0 part
  Pure water: 49.7 parts Examples 8 to 9

Aqueous inks B and C for inkjet recording were obtained in the same manner as in Example 7 except that the compositions were changed as indicated in Table 4, respectively.

Comparative Example 5

An aqueous ink D for inkjet recording heaving a pigment concentration of 4% by mass was prepared in the same manner as in Example 7 except that the aqueous pigment dispersion M-4 obtained in Comparative Example 1 was used.

Comparative Example 6

An aqueous ink E for inkjet recording having a pigment concentration of 4% by mass and a composition indicated in Table 4 was prepared by adding the compound (AO-1), which is an alkylene oxide adduct having a polyamine structure used in Example 1, to the aqueous pigment dispersion M-4 obtained in Comparative Example 1 instead of triethylene glycol used for preparing ink.

(Aqueous Ink E for Inkjet Recording)
  Aqueous pigment dispersion M-4: 25.8 parts
  2-pyrrolidinone: 8.0 parts
  Compound (AO-1): 4.0 parts
  Triethylene glycol mono-n-butyl ether: 8.0 parts
  Purified glycerin: 3.0 parts
  Surfynol 440 (manufactured by Air Products and Chemicals, Inc.): 0.5 parts
  Phosphate surfactant: 1.0 part
  Pure water: 49.7 parts Comparative Example 7

An aqueous ink F for inkjet recording having a pigment concentration of 4.0% by mass and a composition indicated in Table 4 was prepared by adding the compound (AO-2), which is an alkylene oxide adduct having a polyamine structure used in Example 2, to the aqueous pigment dispersion M-4 obtained in Comparative Example 1 instead of triethylene glycol used for preparing ink.

(Aqueous Ink F for Inkjet Recording)
  Aqueous pigment dispersion M-4: 25.8 parts
  2-pyrrolidinone: 8.0 parts
  Compound (AO-2): 4.0 parts
  Triethylene glycol mono-n-butyl ether: 8.0 parts
  Purified glycerin: 3.0 parts
  Surfynol 440 (manufactured by Air Products and Chemicals, Inc.): 0.5 parts
  Phosphate surfactant: 1.0 part
  Pure water: 49.7 parts Comparative Example 8

An aqueous ink G for inkjet recording having a pigment concentration of 4% by mass and a composition indicated in Table 4 was prepared by adding the compound (AO-3), which is an alkylene oxide adduct having a polyamine structure used in Example 3, to the aqueous pigment dispersion M-4 obtained in Comparative Example 1 instead of triethylene glycol used for preparing ink.

(Aqueous Ink G for Inkjet Recording)
  Aqueous pigment dispersion M-4: 25.8 parts
  2-pyrrolidinone: 8.0 parts
  Compound (AO-3): 4.0 parts
  Triethylene glycol mono-n-butyl ether: 8.0 parts
  Purified glycerin: 3.0 parts
  Surfynol 440 (manufactured by Air Products and Chemicals, Inc.): 0.5 parts
  Phosphate surfactant: 1.0 part
  Pure water: 49.7 parts The mixed compositions of the aqueous pigment dispersions are indicated in Tables 2 and 3, and the mixed compositions of the aqueous inks for inkjet recording are indicated in Table 4. Those with no units in Tables represent the number of parts.

TABLE 2

|  | Example 1 | Example 2 | Example 3 | Example 4 | Example 5 | Example 6 |
| --- | --- | --- | --- | --- | --- | --- |
| Name of aqueous pigment dispersion | M-1 | M-2 | M-3 | R-1 | B-1 | Y-1 |
| Pigments | Quinacridone | Quinacridone | Quinacridone | Azo red | Phthalocyanine blue | Azo yellow |

TABLE 2-continued

|  | Example 1 | Example 2 | Example 3 | Example 4 | Example 5 | Example 6 |
|---|---|---|---|---|---|---|
| Pigment concentration | 15.50% | 15.50% | 15.50% | 15.50% | 15.50% | 15.50% |
| Kneading solvent | AO-1 | AO-2 | AO-3 | AO-1 | AO-1 | AO-1 |
| Kneading solvent concentration | 15.50% | 15.50% | 15.50% | 15.50% | 15.50% | 15.50% |

TABLE 3

|  | Comparative Example 1 | Comparative Example 2 | Comparative Example 3 | Comparative Example 4 |
|---|---|---|---|---|
| Name of aqueous pigment dispersion | M-4 | R-2 | B-2 | Y-2 |
| Pigments | Quinacridone | Azo red | Phthalocyanine blue | Azo yellow |
| Pigment concentration | 15.50% | 15.50% | 15.50% | 15.50% |
| Kneading solvent | TEG | TEG | TEG | TEG |
| Kneading solvent concentration | 15.50% | 15.50% | 15.50% | 15.50% |

TABLE 4

|  | Example 7 | Example 8 | Example 9 | Comparative Example 5 | Comparative Example 6 | Comparative Example 7 | Comparative Example 8 |
|---|---|---|---|---|---|---|---|
| Name of aqueous ink for inkjet recording | A | B | C | D | E | F | G |
| Name of aqueous pigment dispersion/parts | M-1/ 25.8 | M-2/ 25.8 | M-3/ 25.8 | M-4/ 25.8 | M-4/ 25.8 | M-4/ 25.8 | M-4/ 25.8 |
| Pigments | Quinacridone | Quinacridone | Quinacridone | Quinacridone | Quinacridone | Quinacridone | Quinacridone |
| Pigment concentration | 4.0% | 4.0% | 4.0% | 4.0% | 4.0% | 4.0% | 4.0% |
| Kneading solvent | AO-1 | AO-2 | AO-3 | TEG | TEG | TEG | TEG |
| Kneading solvent concentration | 4.0% | 4.0% | 4.0% | 4.0% | 4.0% | 4.0% | 4.0% |
| 2-pyrrolidinone | 8.0 | 8.0 | 8.0 | 8.0 | 8.0 | 8.0 | 8.0 |
| Triethylene glycol | 4.0 | 4.0 | 4.0 | 4.0 | None | None | None |
| Triethylene glycol mono-n-butyl ether | 8.0 | 8.0 | 8.0 | 8.0 | 8.0 | 8.0 | 8.0 |
| Purified glycerin | 3.0 | 3.0 | 3.0 | 3.0 | 3.0 | 3.0 | 3.0 |
| Surfynol 440 | 0.5 | 0.5 | 0.5 | 0.5 | 0.5 | 0.5 | 0.5 |
| Phosphate surfactant | 1.0 | 1.0 | 1.0 | 1.0 | 1.0 | 1.0 | 1.0 |
| Other additives/parts | None | None | None | None | AO-1/4 | AO-2/4 | AO-3/4 |
| Pure water | 49.7 | 49.7 | 49.7 | 49.7 | 49.7 | 49.7 | 49.7 |

In Tables, TEG represents triethylene glycol,

AO-1 represents "a compound represented by "General Formula (2)-1" of General Formula name in Table 1, and is a compound in which $R_1$ to $R_4$ are each an isopropylene group, m1 to m4 are each 1, and the sum of m1 to m4 is 4 in General Formula (2)", AO-2 represents "a compound represented by "General Formula (2)-2" of General Formula name in Table 1, and is a compound represented by General Formula (2) in which $R_1$ to $R_4$ are each an isopropylene group, an ethylene group, or a group in which an isopropylene group and an ethylene group are linked, and the sum of m1 to m4 is 4 or 5", and AO-3 represents "a compound represented by "General Formula (2)-3" of General Formula name in Table 1, and is a compound represented by General Formula (2) in which $R_1$ to $R_4$ are each an ethylene group, m1 to m4 are each 1, and the sum of m1 to m4 is 4".

The aqueous pigment dispersions and the aqueous inks for inkjet recording prepared in Examples and Comparative Examples were evaluated by the following methods.

[Method for Measuring Average Particle Diameter]

An average particle diameter was measured using a sample diluted 1,000 times with ion exchange water by means of an ultrafine particle size analyzer "UPA 150" manufactured by MicrotracBEL Corp. The particle diameter is measured by putting approximately 4 mL of aqueous pigment dispersion into a measurement cell and detecting scattered light of the laser light. Note that, a measurement temperature was 25° C.

The upper two digits of the average value based on three times of measurements for a volume average particle diameter (MV) in the measurement result were regarded as effective figures and set as a value (unit: nm) of an average dispersed particle diameter.

[Method for Measuring the Number of Big Particles of Equal to or Larger than 1 μm]

A sample was diluted four times with pure water, and the number of big particles having a circle equivalent diameter of equal to or larger than 1 μm contained in the sample was determined by using a flow particle image analyzer FPIA-3000S (manufactured by Spectris Co., Ltd.).

Since the sample was diluted four times, the measurement was performed four times, and the measurement results were summed up. The total amount of the number of the observed particles was divided by the amount of the sample used for the measurement, and the number of the big particles contained in 1 μL of sample was set as an evaluation value (unit: number/μL).

[Method for Measuring the Number of Big Particles of Equal to or Larger Than 0.5 μm]

The number of particles having a diameter of equal to or larger than 0.5 μm contained in the sample diluted 500 to 1,000 times with ion exchange water was measured by using an automated particle optical sizer (Accusizer 780 APS) manufactured by Particle Sizing Systems. The measurement result is multiplied by the numerical value of the dilution concentration, and the number of particles contained in 1 mL of the aqueous pigment dispersion is set as the number of the big particles. The number of digits of normally obtained value is too large to compare, and thus is divided by $10^6$ to set a unit as $\times 10^6$ particles/ml. The average value of the three times of measurements was set as the number of the big particles, and the upper two digits were set as effective figures.

[Method for Measuring Printing Density]

A commercially available inkjet printer cartridge was filled with the aqueous ink for inkjet recording which was left to stand for 24 hours or longer, a specific pattern was printed on recycled paper and inkjet recording paper. The print pattern in which the image density was set to be 50% was measured with Spectoroscan manufactured by X-Rite. C* (saturation) of the printed pattern was calculated from the obtained colorimetric result, and the value (C*/L* (lightness)) divided by L* was set as an evaluation value. A print pattern with high saturation and low lightness has high rating, and specifically, the recycled paper has a high rating at equal to or greater than 0.80, and inkjet recording paper has a high rating at equal to or greater than 0.86.

The evaluation results of the aqueous pigment dispersions and the aqueous inks for inkjet recording are shown in Tables 5 and 6.

TABLE 5

Evaluation results of aqueous pigment dispersion

| | Name | Pigments | Volume average particle diameter (nm) | The number of big particles of equal to or larger than 1 μm (number/μL) |
|---|---|---|---|---|
| Example 1 | M-1 | Quinacridone | 110 | 89 |
| Example 2 | M-2 | Quinacridone | 90 | 28 |
| Example 3 | M-3 | Quinacridone | 120 | 357 |
| Comparative Example 1 | M-4 | Quinacridone | 120 | 183 |

TABLE 6

Evaluation results of aqueous ink for inkjet recording

| | Name | Volume average particle diameter (nm) | The number of big particles of equal to or larger than 1 μm (number/μL) | Printing density Recycled paper | Printing density Inkjet recording paper |
|---|---|---|---|---|---|
| Example 7 | A | 90 | 40 | 0.82 | 0.87 |
| Example 8 | B | 91 | 83 | 0.82 | 0.96 |
| Example 9 | C | 90 | 423 | 0.82 | 0.89 |
| Comparative Example 5 | D | 110 | 2858 | 0.77 | 0.85 |
| Comparative Example 6 | E | 110 | 84 | | |
| Comparative Example 7 | F | 100 | 108 | | |
| Comparative Example 8 | G | 110 | 439 | | |

Tables 5 and 6 indicate the results of aqueous pigment dispersions using a quinacridone pigment as a pigment type and aqueous ink for inkjet recording using the aqueous pigment dispersions. As a result, in the aqueous pigment dispersions in Examples 1 to 3 which are obtained by using the preparing method of the present invention, and the aqueous inks for inkjet recording in Examples 7 to 9 in which the aqueous pigment dispersions are used, the volume average particle diameter was small and the number of big particles having a diameter of equal to or larger than 1 μm was small.

Comparative Examples 1 and 5 are examples in which an alkylene oxide adduct having a polyamine structure is not used at all. In this case, the volume average particle diameter is large, and there are a number of big particles having a diameter of equal to or larger than 1 μm. In addition, Comparative Examples 6 to 8 are examples in which an alkylene oxide adduct having a polyamine structure was not added at the time of preparing an aqueous pigment dispersion but was added at the time of preparing an aqueous ink, and in this case, the volume average particle diameter did not become smaller and the number of big particles was not decreased as compared with a dispersion using the alkylene oxide adduct having a polyamine structure in kneading.

Examples 7 to 9 indicates a result that the aqueous ink in Example 7 had the smallest number of the big particles having a diameter of equal to or larger than 1 μm. It can be said that the alkylene oxide adduct having a polyamine structure used in Example 7, which is a compound containing an oxypropylene group as AO-1, that is, an oxyalkylene group has a highest effect of reducing the number of big particles having a diameter of equal to or larger than 1 μm.

In addition, the print density of the aqueous inks of Examples 7 to 9 was higher than that of Comparative Example 5 in all of the results printed on the recycled paper and inkjet recording paper.

TABLE 7

| | Name | Pigments | Alkylene oxide adduct | Volume average particle diameter (nm) | The number of big particles of equal to or larger than 0.5 μm ($\times 10^6$ number/mL) |
|---|---|---|---|---|---|
| Example 1 | M-1 | Quinacridone | AO-1 | 110 | 600 |
| Comparative Example 1 | M-4 | Quinacridone | TEG | 120 | 3900 |
| Example 4 | R-1 | Azo red | AO-1 | 150 | 1600 |
| Comparative Example 2 | R-2 | Azo red | TEG | 160 | 12000 |
| Example 5 | B-1 | Phthalocyanine blue | AO-1 | 100 | 5200 |
| Comparative Example 3 | B-2 | Phthalocyanine blue | TEG | 110 | 33000 |
| Example 6 | Y-1 | Azo yellow | AO-1 | 90 | 3300 |
| Comparative Example 4 | Y-2 | Azo yellow | TEG | 100 | 10200 |

In Table 1, the aqueous pigment dispersions are classified for each same pigment type so as to easily compare. A quinacridone pigment is used as a pigment type in Example 1 and Comparative Example 1, an azo red pigment is used as a pigment type in Example 4 and Comparative Example 2, a phthalocyanine blue pigment is used as a pigment type in Example 5 and Comparative Example 3, and an azo yellow pigment is used as a pigment type in Example 6 and In Comparative Example 4.

As a result, it is clear that as compared with the aqueous pigment dispersions in Comparative Examples, the aqueous pigment dispersions in Examples have small volume average particle diameters and the small number of the big particles having a diameter of equal to or larger than 0.5 μm.

The invention claimed is:

1. A method for producing an aqueous pigment dispersion, comprising:
    a step of providing a mixture containing:
        a pigment,
        an anionic group-containing organic polymer compound,
        a basic compound, and
        from 1% to 500% by mass of alkylene oxide adduct having a polyamine structure with respect to the pigment;
    a step of kneading the mixture to obtain a kneaded material, wherein the mixture in the step of kneading contains no water or less than 30% by mass with respect to a solid content of the mixture; and
    a step of dispersing the kneaded material into water.

2. The method for producing an aqueous pigment dispersion according to claim 1,
    wherein the alkylene oxide adduct having a polyamine structure contains an oxypropylene group.

3. An aqueous ink for inkjet recording,
    wherein an aqueous pigment dispersion obtained according to the producing method according to claim 1 is used.

4. The method for producing an aqueous pigment dispersion according to claim 1, wherein the alkylene oxide adduct is represented by formula (1);

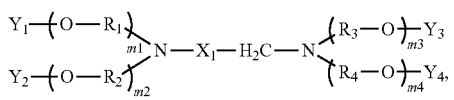

where $R_1$ to $R_4$ each independently represents an alkylene group having 1 to 8 carbon atoms which can be branched; $Y_1$ to $Y_4$ each independently represent a hydrogen atom, m1 to m4 each independently represent an integer of 1; $X_1$ each independently represents one of the following groups or a group in which plural of the following groups connect each other,

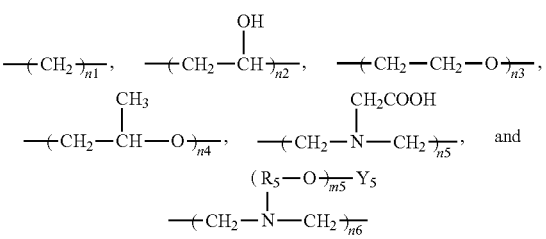

wherein n1 to n6 each independently represent an integer of 0 to 10.

5. The method for producing an aqueous pigment dispersion according to claim 4, wherein in the formula (1), $R_1$ to $R_4$ each independently represent isopropylene group or n-propylene group.

* * * * *